United States Patent
Kim et al.

(10) Patent No.: US 6,627,575 B2
(45) Date of Patent: Sep. 30, 2003

(54) DOUBLE METAL CYANIDE COMPLEX CATALYST FOR PRODUCING POLYOL

(75) Inventors: Il Kim, Ulsan (KR); Sang Hyun Lee, Ulsan (KR)

(73) Assignee: SK Evertec Co., Ltd., Ulsan (KR)

( * ) Notice: Subject to any disclaimer, the term of this patent is extended or adjusted under 35 U.S.C. 154(b) by 0 days.

(21) Appl. No.: 10/112,843

(22) Filed: Mar. 29, 2002

(65) Prior Publication Data

US 2002/0177523 A1 Nov. 28, 2002

(30) Foreign Application Priority Data

Apr. 18, 2001 (KR) .................................. 2001-0020627

(51) Int. Cl.[7] .............................................. B01J 27/26
(52) U.S. Cl. ...................................... 502/175; 502/200
(58) Field of Search .................................. 502/175, 200

(56) References Cited

U.S. PATENT DOCUMENTS 5,527,880 A * 6/1996 Le-Khac ..................... 528/415

* cited by examiner

Primary Examiner—Elizabeth D. Wood
(74) Attorney, Agent, or Firm—Harrison & Egbert

(57) ABSTRACT

A double metal cyanide complex catalyst for producing polyol, which is produced by using monovalent alcohol and polyvalent alcohol as a complexing agent. The double metal cyanide complex catalyst has advantages in that when polyol is produced by an epoxide polymerization reaction, the amount of unsaturated polyol produced is small, catalyst activation time is short, and the production yield of polyol is increased. There is no need to remove remaining catalyst from polyol after the polymerization reaction.

2 Claims, 1 Drawing Sheet

DOUBLE METAL CYANIDE COMPLEX CATALYST FOR PRODUCING POLYOL

RELATED U.S. APPLICATIONS

Figure 1:
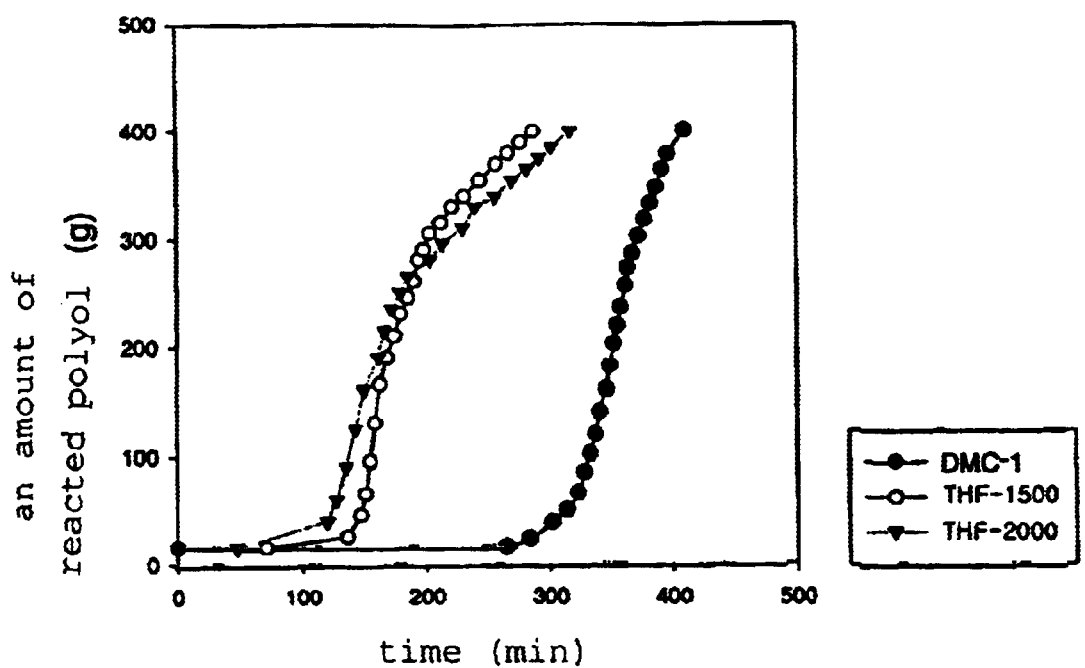

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates, in general, to a double metal cyanide complex catalyst for producing polyol used in producing polyurethane and, in particular, to a double metal cyanide complex catalyst useful for producing polyoxyether polyol and polyether polyol.

BACKGROUND OF THE INVENTION

A double metal cyanide complex catalyst for producing polyol is generally expressed by formula I, below:

$$M_a[M'(CN)_6]_b L_c \qquad \text{Formula I}$$

wherein, M and M' are metal elements, L is a complexing agent, and a+b+c+d equals a sum of electrovalences of M and M' and a, b, c, and d are integers.

The present invention provides a double metal cyanide complex catalyst for producing polyol expressed by formula I, which is produced by using a monovalent alcohol such as ethanol or butanol, and polyvalent alcohol such as polypropylene glycol as the complexing agent.

Polyol is a compound with plural hydroxyl groups, and polyurethane is produced by the condensation reaction of an isocyanate compound with polyol.

Polyol used in producing polyurethane is produced by the epoxide polymerization reaction of hydrocarbon-based oxide such as ethylene oxide or propylene oxide, with the use of a polymerization initiator in the presence of an alkali hydroxide catalyst such as KOH.

The epoxide polymerization reaction is a reaction which produces polymer by a ring-opening reaction of epoxy group, as expressed by the following formula.

$$\text{initiator} + CH_2OCH_2 \xrightarrow[\text{KOH}]{\text{polymerization}} HO(CH_2CH_2O)_nH$$
(etylene oxide) (polyoxyethylene glycol)

Characterized by urethane bonds (—NH—CO—O—), polyurethanes are versatile in size and kind as exemplified by those used in construction, fibers, foams, elastic bodies, and pigments. A flexible urethane is produced by using polyol with the relatively high molecular weight of 3000 to 6000, and a rigid urethane is produced by using polyol with a low molecular weight of 150 to 1000.

The double metal cyanide complex is produced by reacting metal salts and metal cyanide salts with the complexing agent.

Metal salts are expressed by $M(X)_n$, where M is the metal element and X is a compound constituting salts. Examples of metals used in producing the double metal complex include Zn (II), Fe (II), Ni (II), Mn (II), Co (II), Sn (II), Pb (II), Fe (III), Mo (IV), Mo (VI), Al (II), V (V), V (IV), Sr (II), W (IV), W (VI), Cu (II), and Cr (III), and the compound constituting salts are exemplified by halogenate, hydroxide, sulfate, carbonate, cyanide, oxalate, thiocyanate, isocyanate, isothiocyanate, carboxylate, and nitrate. Typically, n is an integer of 1 to 3, depending on the valence of the metal.

Metal salts used in producing the double metal complex include zinc chloride, zinc bromide, zinc acetate, zinc acetonylacetonate, zinc benzoate, zinc nitrate, iron bromide (II), cobalt chloride (II), cobalt thiocyanate (II), nickel formate (II), and nickel nitrate (II).

Metal cyanide salts may be expressed by $(Y)_a M'(CN)_b (A)_c$, wherein Y is alkali metal or alkaline metal; M' is the metal element and is selected from the group consisting of Fe (II), Fe (III), Co (II), Co (III), Cr (II), Cr (III), Mn (II), Mn (III), Ir (III), Ni (II), Rh (III), Ru (II), V (V), and V (IV); A is an ion selected from the group consisting of halogenate, hydroxide, sulfate, carbonate, cyanide, oxalate, thiocyanate, isocyanate, isothiocyanate, carboxylate, and nitrate; a and b are integers greater than 1, respectively; and the sum of electric charges of a, b, and c balances with the electric charge of M'. Generally, an example of metal cyanide salts includes potassium hexacyanocobaltate (III), potassium hexacyanoferrate (II), potassium hexacyanoferrate (III), calcium hexacyanocobaltate (II), and lithium hexacyanoferrate (II).

Useful as the complexing agent is ethylene glycol, dimethyl ether, alcohol aldehyde ketone, ether, ester, amide, urea, or nitrile.

A double metal cyanide catalyst has been already suggested, which was prepared by using ethylene glycol or dimethyl ether as the complexing agent (U.S. Pat. Nos. 4,477,589, 3,821,505, and 5,158,922); and a catalyst prepared by using alcohol, aldehyde, ketone, ether, ester, amide, urea, or nitrile as the complexing agent (U.S. Pat. No. 5,158,992), as well as a catalyst prepared by using t-butyl alcohol (U.S. Pat. No. 5,780,584), have also been suggested.

However, catalysts prepared by using only one of the complexing agents as described in the above prior art have problems in that reactivities of the catalysts are low because the time required to activate them is too long, e.g. 4 hours or longer during epoxide polymerization, and unsaturation is high, up to 0.02 to 0.07 meq/g in the case of producing polyol with a high molecular weight of 3000 to 6000.

On the whole, a polyol is reacted with a diisocyanate to form a polyurethane in which urethane bonds are three-dimensionally arranged. But, unsaturated polyol negatively affects the polymerization of urethane.

BRIEF SUMMARY OF THE INVENTION

Therefore, it is an object of the present invention to provide a double metal cyanide complex catalyst for producing polyol, which serves to reduce production of unsaturated polyol and shorten catalyst activation time, as well as resulting in not having to remove remaining catalysts from polyol after polymerization when polyoxyetherpolyol and polyetherpolyol are produced by an epoxide polymerization reaction.

BRIEF DESCRIPTION OF THE VIEW OF THE DRAWINGS

The above and other objects, features and other advantages of the present invention will be more clearly understood from the following detailed description taken in conjunction with the accompanying drawings.

FIG. 1 is an illustration of a graph showing amounts of reacted polyol as a function of time of catalysts according to examples and a comparative example of the present invention.

DETAILED DESCRIPTION OF THE INVENTION

The present inventors have conducted extensive studies into production of a double metal cyanide complex catalyst by reaction of metal salts and metal cyanide salts with a complexing agent, finding that when the double metal cyanide complex is prepared by using monovalent alcohol together with polyvalent alcohol as a complexing agent, the degree of unsaturation of polyol is reduced, catalyst activation time is shortened, and the amount of used catalyst is significantly reduced, resulting in not having to remove the catalyst from polyol after the polymerization reaction.

The present invention pertains to a double metal cyanide complex catalyst for producing polyol. The double metal cyanide complex catalyst is expressed by formula II below:

$$M_a[M'(CN)_6]_b L_c L'_d \quad \text{Formula II}$$

wherein, M and M' are metal elements, L and L' are complexing agents, and a, b, c, and d are integers and a sum of them equals a sum of electrovalences of M and M'.

The double metal cyanide complex catalyst of the present invention is prepared by using metal salts and metal cyanide salts together with monovalent alcohol and polyvalent alcohol as the complexing agent in such a way that the monovalent alcohol content is 5 to 80 wt % and the polyvalent alcohol content is 0.1 to 20 wt %. Monovalent alcohol used as the complexing agent in the present invention is selected from the group consisting of ethanol, isopropanol, n-butanol, isobutanol, sec-butanol, t-butanol, and polyvalent alcohol is selected from the group consisting of poly(propylene glycol), poly(ethylene glycol), poly(tetra hydrofuran) (hereinafter, referred to as poly(THF)) poly(oxyethylene propylene) copolymer, poly(oxyethylene tetrahydrofuran) copolymer, and poly(oxypropylene tetrahydrofuran) copolymer.

In order to add the complexing agent to the catalytically active metal component during production of the catalyst, the catalytically active metal component is ball-milled. As a result, the crystal structure of the metal component is broken, thereby the heterogeneous double metal cyanide complex catalyst is decreased in crystallinity. In addition, the particle size of the metal component is reduced, so as to broaden the surface area of the catalyst and increase the catalytic activity, and catalyst induction time to activation is significantly shortened to 1 hour or shorter. The resulting catalyst has very high activity, and so when propylene oxide is polymerized at 105° C., polyether polyol having an activity of 1 kg-PO/g-Co/min or more and a very low unsaturation can be produced. Also, the step of removing the catalyst from polyol can be omitted by using a very low concentration of the catalyst because the catalyst activity is high.

"kg-PO/g-Co/min" is a unit indicating a catalyst's activity. Herein, the catalytic activity is defined as "an amount of reacted propylene oxide PO per unit gram of Co as a component constituting the catalyst", and so "kg-PO/g-Co/min" means that 1 kg of PO per unit gram of Co is reacted in 1 min.

Preferably, polyvalent alcohol is polyether polyol with a hydroxyl group functionality of 1 to 8. Useful polyvalent alcohol includes poly(propylene glycol) (hereinafter, referred to as PPG), poly(ethylene glycol), EO-capped poly(oxypropylene), EO-PO polyol, butylene oxide, and copolymers of thereof.

According to the present invention, an excess amount of an aqueous solution of metal salts such as zinc chloride and metal cyanide salts such as potassium hexacyanocobaltate are mixed and reacted with the complexing agent, such as t-butanol, to produce a catalyst slurry comprising reaction products of metal salts and metal cyanide salts, i.e. double metal cyanide complex catalyst of the present invention. Then, the catalyst slurry thus produced is mixed with polyvalent alcohol. The resulting mixture is milled by a ball mill made of ceramics (volume: 500 ml, five balls with a diameter of 2.3 cm, and ten balls with a diameter of 1.3 cm) at room temperature for 24 hours. After that, the solid catalyst containing polyvalent alcohol is separated from the catalyst slurry by filtration or centrifugal separation.

The solid catalyst thus separated is mixed with an aqueous solution containing an organic complexing agent. Then, the catalyst is separated, and is again mixed with the aqueous solution containing the organic complexing agent. Preferably, the amount of organic complexing agent in the aqueous solution ranges from about 40 to 70 wt %.

Separated from the aqueous solution, the catalyst is dried at 40 to 90° C. under 26 in.Hg to 30 in.Hg until a weight of the catalyst is constant.

The catalyst of the present invention has a considerably higher activity than a conventional double metal cyanide catalyst. The conventional double metal cyanide catalyst, which is produced by using only ethylene glycol as the complexing agent (U.S. Pat. Nos. 4,477,589, 3,829,505, 5,158,922), has an activity of 0.1 to 0.5 kg-PO/gCo/min per 100 ppm catalyst at 105° C. On the other hand, the catalyst of the present invention shows an activity of 1 kg-PO/g-Co/min or more per 100 ppm catalyst. The catalytic activity of the present invention is much higher than that of a zinc hexacyanocobaltate catalyst produced by using only t-butanol as the complexing agent. In particular, induction time to activation, which lasts until the polymerization reaction is activated, is shortened from 4 hours or longer to 2 hours or shorter.

The catalyst of the present invention has sufficient activity although the concentration of the catalyst is considerably lowered to 25 ppm. Polyether polyol products produced by a low concentration of the catalyst have advantages in that the catalyst does not significantly affect polyol products even though the catalyst remains in products. For example, amounts of Zn and Co remaining in polyol products produced by the catalyst of the present invention are less than 5 ppm before purification of polyol, respectively.

A better understanding of the present invention may be obtained in light of the following examples which are set forth to illustrate, but are not to be construed to limit the present invention.

<Production of Catalysts>

EXAMPLE 1

In a beaker 63 g of zinc chloride, 231 ml of distilled water, and 42 ml of t-butanol (mixture solution 1) were mixed. 6.3 g of potassium hexacyanocobaltate were dissolved in 84 ml of distilled water (mixture solution 2) in another beaker. The mixture solution 1 was added to the mixture solution 2 with mechanical agitation at 50° C. for one hour, then they were reacted with each other for 10 min. Solid was then separated from the resulting solution by high-speed centrifugation. Into the catalyst slurry thus obtained was added a solution of 10 ml of distilled water, 2 ml of t-butanol as monovalent alcohol, and 7 g of poly(THF)(molecular weight: 1500) as polyvalent alcohol. The resulting slurry was milled by a ball mill made of ceramics (volume: 500 ml, five balls with a diameter of 2.3 cm, and ten balls with a diameter of 1.3 cm) at room temperature for 24 hours. 200 ml of t-butanol was added to the slurry thus milled and the resulting slurry was agitated for 1 hour. Solid catalyst was separated from the resulting slurry by high-speed centrifugation. Wet catalyst cake thus separated was dried at 60° C. under 30 in.Hg until the weight of the catalyst was achieved to produce a catalyst of the present invention (catalyst 1), and the catalyst 1 was analyzed by X-ray diffraction. Results are described in table 2.

EXAMPLES 2 TO 5

The procedure of example 1 was repeated exactly, except that poly(THF)s with molecular weights of 2000, 250, and 1000, and PPG 725 were used. Catalysts 2, 3, 4, and 5 are catalysts produced by using poly(THF)s with molecular weights of 2000, 250, and 1000, and by using PPG 725, respectively. Catalysts 2 to 5 were analyzed by X-ray diffraction analysis. Results are described in Table 2.

EXAMPLE 6

The procedure of example 1 was repeated exactly to produce catalyst 6 except that 14 g of poly(THF) with a molecular weight of 1500 was used instead of 7 g of poly(THF).

COMPARATIVE EXAMPLE 1

63 g of zinc chloride, 231 ml of distilled water, and 42 ml of t-butanol (solution 1) were mixed in a beaker. 6.3 g of potassium hexacyanocobaltate were dissolved in 84 ml of distilled water (solution 2) in another beaker. The solution 2 was added to the solution 1 with mechanical agitation at 50° C. for one hour, they were then reacted with each other for 10 min. Solid was then separated from the resulting solution by high-speed centrifugation. Into the catalyst slurry thus obtained was added a mixture of 10 ml of distilled water and 5 ml of t-butanol. The resulting slurry was milled by a ball mill made of ceramics (volume: 500 ml, five balls with a diameter of 2.3 cm, and ten balls with a diameter of 1.3 cm) at room temperature for 24 hours. 200 ml of t-butanol was added to the slurry thus milled and the resulting slurry was agitated for 1 hour. Solid catalyst was separated from the resulting slurry by a high speed centrifuge. Wet catalyst cake thus separated was dried at 60° C. under 30 in.Hg until the weight of the catalyst was constant to produce DMC-1 catalyst.

COMPARATIVE EXAMPLE 2

The procedure of comparative example 1 was repeated exactly to produce DMC-2 catalyst, except that a high-speed centrifugal separator was used instead of the ball mill.

<Production of Polyol>

EXAMPLE 7

Into an autoclave of 1l were discharged 70 g of glycerol propoxylate with a molecular weight of 725 as a starter polyol and 0.3 g of catalyst of example 1. The resulting mixture was agitated, heated to 95° C., and maintained under vacuum. Then, 15 g of propylene oxide (PO) monomer was added into the autoclave, and addition of PO was then stopped. After the pressure was increased from vacuum to 4 psig, propylene oxide was again added to the autoclave at the point where pressure in the autoclave began dropping, that is, at 94° C., until the amount of PO in the autoclave reached 400 g, at which point the pressure was increased to 10 psig and maintained. After reaction was completed, the autoclave was maintained at 60 to 80° C. under vacuum for 30 min in order to remove unreacted PO from the autoclave, thereby polyol (polyoxypropylene polyol) was produced.

Catalytic activity was measured at the steepest slope of the graph in FIG. 1 (Refer to a polymerization rate in FIG. 1 and Table 1; polymer was cooled and recycled). Polymerization reaction conditions and physical properties of polyol (OH value, unsaturation) are described in Table 1.

EXAMPLES 8 TO 10

The procedure of example 7 was repeated exactly to produce polyols, except that reactors were maintained at 105° C. (example 8), 115° C. (example 9), and 130° C. (example 10), respectively.

EXAMPLE 11

The procedure of example 7 was repeated exactly to produce polyol, except that catalyst 6 was used instead of catalyst 1.

EXAMPLES 12 TO 14

The procedure of example 11 was repeated exactly to produce polyols, except that reactors were maintained at 105° C. (example 12), 115° C. (example 13), and 130° C. (example 14), respectively.

EXAMPLE 15

The procedure of example 9 was repeated exactly to produce polyol, except that catalyst 2 was used.

EXAMPLES 16 AND 17

The procedure of example 15 was repeated exactly to produce polyols, except that reactors were maintained at 105° C. (example 16) and 115° C. (example 17), respectively.

EXAMPLES 18 AND 19

The procedure of example 7 was repeated exactly to produce polyols, except that catalyst 3 (example 18) and catalyst 4 (example 19) were used, and that reactors were both maintained at 115° C.

EXAMPLE 20

The procedure of example 15 was repeated exactly to produce polyol, except that catalyst 5 was used.

EXAMPLES 21 TO 23

The procedure of example 20 was repeated exactly to produce polyols, except that reactors were maintained at 105° C. (example 21), 115° C. (example 22), and 130° C. (example 23), respectively.

COMPARATIVE EXAMPLE 3

The procedure of example 7 was repeated exactly to produce polyol, except that DMC-1 catalyst was used and reactors were maintained at 105° C.

FIG. 1 is a graph showing comparison of induction time to activation of catalyst according to the present invention with that of a conventional catalyst (DMC-1), and also showing induction times to activation of catalysts when the amount of reacted polyol is drastically increased. THF-1500 and THF-2000 mean catalysts produced by using poly (THF)s with molecular weights of 1500 and 2000, respectively.

As described above, a double metal cyanide complex catalyst of the present invention has advantages in that the concentration of unsaturated polyol is reduced to 0.005 meq/g or less and catalyst activation time is shortened to 1 hour or less, thereby production yield is increased and the amount of used catalyst is also reduced from 500–100 ppm to 25 ppm.

Other advantages of the double metal cyanide complex catalyst, according to the present invention, are that when polyol is produced by an epoxide polymerization reaction, the production amount of unsaturated polyol is small, catalyst activation time is short, and a high activity is obtained from a small amount of catalyst, thereby there is no need to remove remaining catalyst from polyol after polymerization reaction.

TABLE 1

Variation of polymerization reaction conditions and physical properties of polyol product according to catalysts.

| Run No. | Catalysts | Reaction Temp. (° C.) | Induction Time(min) | Reaction Rate(g/min) | OH value (mg KOH/g) | [1]Unsat. (meq/g) |
|---|---|---|---|---|---|---|
| Exam.7 | Catalyst 1 | 95 | 360 | 3.80 | 46.6 | 0.003 |
| Exam.8 | | 105 | 227 | 3.65 | 36.2 | 0.004 |
| Exam.9 | | 115 | 151 | 3.20 | 36.2 | 0.005 |
| Exam.10 | | 130 | 121 | 2.55 | 36.1 | 0.006 |
| Exam.11 | Catalyst 6 | 95 | 186 | 9.87 | 36.4, | 0.004 |
| Exam.12 | | 105 | 395 | 7.08 | 36.5 | 0.005 |
| Exam.13 | | 115 | 71 | 7.63 | 56.4 | 0.004 |
| Exam.14 | | 130 | 203 | 3.81 | 40.3 | 0.005 |
| Exam.15 | Catalyst 2 | 95 | 77 | 3.15 | | |
| Exam.16 | | 105 | 43 | 5.87 | | |
| Exam.17 | | 115 | 48 | 4.01 | | |
| Exam.18 | Catalyst 3 | 115 | 810 | 3.24 | 36.3 | 0.004 |
| Exam.19 | Catalyst 4 | 115 | 827 | 2.84 | 44.7 | 0.003 |
| Exam.20 | Catalyst 5 | 95 | 92 | 4.46 | 27.9 | 0.022 |
| Exam.21 | | 105 | 85 | 2.51 | 42.4 | 0.023 |
| Exam.22 | | 115 | 95 | 2.31 | 20.7 | 0.027 |
| Exam.23 | | 130 | 32 | 2.40 | 34.9 | 0.023 |
| Co.Ex.3 | DMC-1 | 115 | 270 | 6.26 | 31.0 | 0.017 |

[1]Unsat.: unsaturation

TABLE 2

Analysis of catalysts by X-ray diffraction.

| Catalysts | X-ray diffraction analysis (d-spacings, Angstroms) | | | | | | |
|---|---|---|---|---|---|---|---|
| | 5.75 | 5.07 | 4.82 | 3.76 | 3.59 | 2.54 | 2.28 |
| DMC-2 | None | X | None | None | X | X | X |
| DMC-1 | None | None | X | X | None | None | None |
| Catalyst 5 | None | X | None | X | X | None | None |
| Catalyst 3 | X | None | None | X | X | X | None |
| Catalyst 4 | None | None | None | X | None | None | None |
| Catalyst 1 | None | None | None | X | None | None | None |
| Catalyst 2 | None | None | None | X | None | None | None |
| Catalyst 6 | None | None | None | X | None | None | None |

X means that X-ray diffracion peak exists.

The present invention has been described in an illustrative manner, and it is to be understood that the terminology used is intended to be in the nature of description rather than of limitation. many modifications and variations of the present invention are possible in light of the above teachings. Therefore, it is to be understood that within the scope of the appended claims, the invention may be practiced otherwise than as specifically described.

We claim:

1. A double metal cyanide complex catalyst for producing polyol expressed by Formula II:

$$M_a[M'(CN)_6]_b L_c L'_d \qquad \text{Formula II}$$ 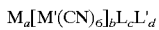

wherein, M and M' are metal elements, L and L' are complexing agents, and a, b, c, and d are integers with the proviso that a+b+c+d equals a sum of electrovalences of M and M';

M is selected from the group consisting of Zn (II), Fe (II), Ni (II), Mn (II), Co (II), Sn (II), Pb (II), Fe (III), Mo (IV), Mo (VI), Al (II), V M, V (IV), Sr (II), W (IV), W (VI), Cu (II), and Cr (III);

M' is selected from the group consisting of Fe (II), Fe (III), Co (II), Co (III), Cr (II), Cr (III), Mn (II), Mn (III), Ir (III), Ni (II), Rh (III), Ru (II), V (V), and V (IV);

L is monovalent alcohol, and

L' is polyvalent alcohol, wherein the polyvalent alcohol is contained in an amount of 0.1 to 20 wt % and the monovalent alcohol is contained in an amount of 10 to 80 wt % based on the weight of the catalyst.

2. The double metal cyanide complex catalyst according to claim 1, wherein the monovalent alcohol is selected from the group consisting of ethanol, isopropanol, n-butanol, isobutanol, sec-butanol, t-butanol, and the polyvalent alcohol is selected from the group consisting of poly(propylene glycol), poly(ethylene glycol), poly(tetra hydrofuran)poly (oxyethylene propylene) copolymer, poly(oxyethylene tetrahydrofuran) copolymer, and poly(oxypropylene tetrahydrofuran) copolymer.

* * * * *